(12) United States Patent
Wachter et al.

(10) Patent No.: US 12,203,524 B2
(45) Date of Patent: Jan. 21, 2025

(54) ELECTRICAL MACHINE THAT IS ELASTICALLY SECURED TO A FRAME CONSTRUCTION

(71) Applicant: Innomotics GmbH, Nuremberg (DE)

(72) Inventors: Raimund Wachter, Ellingen (DE); Ulrich Werner, Bubenreuth (DE)

(73) Assignee: Innomotics GmbH, Nuremberg (DE)

( * ) Notice: Subject to any disclaimer, the term of this patent is extended or adjusted under 35 U.S.C. 154(b) by 400 days.

(21) Appl. No.: 17/785,775

(22) PCT Filed: Dec. 17, 2020

(86) PCT No.: PCT/EP2020/086596
§ 371 (c)(1),
(2) Date: Jun. 15, 2022

(87) PCT Pub. No.: WO2021/139990
PCT Pub. Date: Jul. 15, 2021

(65) Prior Publication Data
US 2023/0074068 A1    Mar. 9, 2023

(30) Foreign Application Priority Data
Jan. 10, 2020   (EP) .................................. 20151183.9

(51) Int. Cl.
*F16F 15/03*    (2006.01)
*F16F 7/10*    (2006.01)
(Continued)

(52) U.S. Cl.
CPC ............ *F16F 15/03* (2013.01); *F16F 7/1011* (2013.01); *F16F 15/005* (2013.01); *F16F 15/022* (2013.01); *F16F 15/08* (2013.01)

(58) Field of Classification Search
CPC ...................................................... F16F 15/03
See application file for complete search history.

(56) References Cited

U.S. PATENT DOCUMENTS

| | | |
|---|---|---|
| 2007/0001354 A1 | 1/2007 | Stothers et al. |
| 2012/0076652 A1 | 3/2012 | Ventzke et al. |
| | (Continued) | |

FOREIGN PATENT DOCUMENTS

| | | | |
|---|---|---|---|
| CN | 102418875 A | 4/2012 | |
| CN | 108167379 A * | 6/2018 | ............ F16F 15/022 |
| | (Continued) | | |

OTHER PUBLICATIONS

EP-2615325-B1—English machine translation (Year: 2019).*
(Continued)

*Primary Examiner* — Melanie Torres Williams
(74) *Attorney, Agent, or Firm* — Henry M. Felereisen LLC (57) ABSTRACT

A machine assembly includes a load machine secured to a frame construction. An electrical machine is coupled to the load machine and drives the load machine. The electrical machine is secured to the frame construction via multiple intermediate elements. Frame-side main parts of the intermediate elements are secured to the frame construction and machine-side main parts of the intermediate elements are secured to the electric machine. Spring assemblies are respectively arranged between the machine-side main parts and the frame-side main parts for transferring a weight force of the electric machine from the machine-side main parts to the frame-side main parts.

12 Claims, 7 Drawing Sheets

(51) Int. Cl.
 *F16F 15/00* (2006.01)
 *F16F 15/02* (2006.01)
 *F16F 15/08* (2006.01)

(56) References Cited

U.S. PATENT DOCUMENTS

| | | | |
|---|---|---|---|
| 2013/0105660 | A1 | 5/2013 | Johnson et al. |
| 2020/0031256 | A1 | 1/2020 | Werhahn et al. |

FOREIGN PATENT DOCUMENTS

| | | | | |
|---|---|---|---|---|
| CN | 209170121 | U | 7/2019 | |
| CN | 110431041 | A | 11/2019 | |
| DE | 102012015974 | A1 | 2/2013 | |
| DE | 10 2016 103 579 | A1 | 8/2017 | |
| EP | 0 432 461 | A1 | 6/1991 | |
| EP | 2615325 | B1 * | 10/2019 | ............ F16F 13/264 |
| FR | 2 986 842 | A1 | 8/2013 | |
| JP | 2004-150546 | A | 5/2004 | |
| JP | 2008-208859 | A | 9/2008 | |
| JP | 2014-020477 | A | 2/2014 | |
| JP | 2017057881 | A | 3/2017 | |
| SU | 898178 | A2 | 1/1982 | |
| WO | WO 2005-017386 | A2 | 2/2005 | |
| WO | WO 2006-106134 | A1 | 10/2006 | |
| WO | WO 2013184456 | A1 | 12/2013 | |

OTHER PUBLICATIONS

CN-108167379-A—English machine translation (Year: 2018).*
PCT International Search Report and Written Opinion of International Searching Authority mailed Mar. 30, 2021 corresponding to PCT International Application No. PCT/EP2020/086596 filed Dec. 17, 2020.
Zhu Tong et al.; "Vibration isolation for frame foundation of a power machinery"; Publish date: Feb. 28, 2010; pp. 121-124; State Key Laboratory of Coastal and offshore Engineering, Dalian University of Technology, Dalian 116024, China.

* cited by examiner

ELECTRICAL MACHINE THAT IS ELASTICALLY SECURED TO A FRAME CONSTRUCTION

CROSS-REFERENCES TO RELATED APPLICATIONS

This application is the U.S. National Stage of International Application No. PCT/EP2020/086596, filed Dec. 17, 2020, which designated the United States and has been published as International Publication No. WO 2021/139990 A1 and which claims the priority of European Patent Application, Ser. No. 20/151,183.9, filed Jan. 10, 2020, pursuant to 35 U.S.C. 119 (a)-(d).

BACKGROUND OF THE INVENTION

The present invention is based on a machine assembly.
wherein the machine assembly has a frame construction,
wherein the machine assembly has a load machine that is fastened to the frame construction,
wherein the machine assembly has an electric machine that is coupled to the load machine, said electric machine driving the load machine.

In many cases—whether for technological reasons or reasons of energy efficiency—it is often important with electric machines to be able to operate them with a variable speed. The electric machines usually drive a corresponding load machine. The setting of the speed as such is often readily achievable, for example through corresponding actuation of a converter feeding the electric machine. Electric machines of this kind, the speed of which is variable during operation, are often also used in large industrial applications, including in the power range above 1 MW.

With larger electric machines, the electric machine is often arranged together with the respective load machine on a shared supporting structure, for example a frame. Following assembly, the machine assembly thus produced—in other words the unit of supporting structure, electric machine and load machine—is brought to its final destination and arranged there on the ground on a corresponding foundation, usually anchored.

In order to be able to operate the machine assembly properly, vibrations of the electric machine are permitted to occur only to a defined extent in the entire speed range—for example within the limit values according to DIN ISO 10816-3. To ensure that vibrations occur only to the defined extent in the entire permissible speed range, the electric machine is designed accordingly by the manufacturer of the electric machine. The design is however often intended for an embodiment in which the electric machine is arranged on a fixed foundation (for example in accordance with DIN EN 60034-14). The frame construction on which the electric machine is arranged is however often far less rigid than a fixed foundation. The reasons for this can be of an installation-specific and economic nature. On account of the different rigidity of the frame construction, the vibration behavior of the electric machine is changed compared to an arrangement on a solid foundation.

It is conceivable in principle to design the electric machine such that it has the desired vibration characteristics also on the frame construction. However, the frame constructions differ from one another. As a result, each machine assembly must be designed and tuned separately. This approach therefore proves unfeasible in practice.

The situation consequently arises that, although the electric machine is designed by the manufacturer to be operated in a certain speed range, this speed range can however only be used fully if the electric machine is arranged on a solid foundation. If on the other hand the machine is arranged on a frame construction, impermissible vibrations are produced in a part of this speed range. As a consequence, this part of the speed range therefore either has to be fully blocked or is permitted to be assumed at least only for a short time (for example during traversal of a smaller "impermissible" speed range when the speed is ramped up from 0 to the rated speed). Depending on the individual case, the restrictions may be readily acceptable, problematic or completely unacceptable.

It is known from DE 10 2016 103 579 A1 to separate different interference variables that can excite an element to produce vibrations.

It is known from WO 2005/017 386 A2 to compensate undesired vibrations actively. A similar disclosure content can be taken from WO 97/36122 A2.

It is known from WO 2006/106 134 A1 to arrange an electric machine on a supporting frame and to support the supporting frame with respect to a hull of a ship at several points by means of active vibration dampers.

An electric machine arranged on a supporting structure is known from JP 2014-020 477 A, wherein a passive damper is arranged in the intermediate space between the supporting structure and a foundation. A similar disclosure content can be taken from JP 2017-057 881 A.

An apparatus with electromagnets is known from FR 2 986 842 A1 which are fastened to two supporting surfaces or elastic bolts and are controlled by a multifrequency harmonic regulator. The electromagnets use a solenoid with fewer vortices. An algorithmic unit stabilizes the generated power in order to compensate mechanical couplings, coupling correction on account of non-linearities of elastic bolts, and correction of the temporal development of the characteristics of physical components. The algorithmic unit controls actions that are applied to the electromagnets.

The object of the present invention consists in creating possibilities by means of which it is possible to operate the electric machine in the entire speed range without causing impermissibly high vibrations of the electric machine.

SUMMARY OF THE INVENTION

The object is achieved with a machine assembly as set forth hereinafter. Advantageous embodiments of the machine assembly are the subject matter of dependent claims.

According to the invention, a machine assembly is embodied such that
the electric machine has several intermediate elements via which the electric machine is fastened to the frame construction,
the intermediate elements in each case have a frame-side main part and a machine-side main part,
the frame-side main parts are fastened to the frame construction and the machine-side main parts are fastened to the electric machine, and the intermediate elements in each case have a spring assembly arranged between the machine-side main parts and the frame-side main parts, via which the weight force of the electric machine is transferred from the machine-side main parts to the frame-side main parts.

It is possible for the intermediate elements to have no further elements. However, it is preferably provided that the intermediate elements additionally have in each case an active actuation element, by means of which a force acting in the vertical direction can be generated between the respective machine-side main part and the respective frame-side main part, a sensor element for detecting a vertical movement of the respective machine-side main part during operation of the electric machine is assigned to each of the machine-side main parts, and the intermediate elements are assigned a regulation facility, to which the vertical movements of the machine-side parts detected by the sensor elements can be fed and which dynamically regulates the active actuation elements during operation of the electric machine so as to counteract the vertical movements of the machine-side main parts.

As a result, an active vibration damping of movements of the electric machine can take place by means of the active actuation elements. This primarily applies in particular to vertical movements of the electric machine. Insofar as movements of the electric machine in the horizontal plane cause a vertical movement in the region of the machine-side main parts, such vibrations can often also be damped.

The active actuation elements are preferably arranged concentrically to the respective spring assembly. This results in a particularly space-saving and efficient arrangement.

It is possible to tune the spring assemblies and the active actuation elements of the intermediate elements to one another such that the spring damping characteristic of at least one of the intermediate elements differs from the spring damping characteristic of at least one other of the intermediate elements. In these cases, it is often possible to influence eigenmodes of the vibrations of the electric machine so that all eigenmodes of the vibration of the electric machine produce a vertical movement in the region of the machine-side main parts and can thus be damped.

It is further possible for the intermediate elements to have resilient buffer elements with a damping effect, via which the machine-side main parts are held under pressure in the horizontal plane relative to the frame-side main parts. By means of this embodiment, vibrations of the electric machine that occur in the horizontal plane can then also be damped if they do not produce any vertical movement in the region of the machine-side main parts.

It is possible to design the intermediate elements such that they are all identical. In this case, vibrations of the electric machine acting exclusively in the horizontal plane can often be damped exclusively by the buffer elements. It is however alternatively possible to design the buffer elements of at least one of the intermediate elements differently from the buffer elements of at least one other of the intermediate elements or to provide at least one additional intermediate element that differs from the other intermediate elements in that the buffer elements of the additional intermediate element are removed without replacement or are replaced with non-resilient bridging elements or do not hold the machine-side main part of the additional intermediate element under pressure in the horizontal plane relative to the frame-side main part of the additional intermediate element. In these cases, an asymmetry is thereby generated that affects the eigenmodes of the vibration of the electric machine. In particular, the design of the intermediate elements (including the additional intermediate element where present) can thereby be such that all eigenmodes of the vibration of the electric machine have a vertical component in the region of the machine-side main parts. In particular if the active actuation elements are additionally also present, in this case it is often possible to influence any movements of the electric machine by regulating the active actuation elements and thus actively influence all eigenmodes of the vibration of the electric machine.

The buffer elements in the horizontal plane preferably act on respective vertical supporting surfaces of the respective machine-side main part and are fastened to holding elements arranged on the respective frame-side main part, which holding elements can be adjusted relative to the respective frame-side main part in a direction orthogonal to the respective vertical supporting surface and fixed relative to the respective frame-side main part. This makes it possible to place the electric machine onto the spring assemblies while the buffer elements are spaced apart from the supporting surfaces, and to engage the buffer elements onto the supporting surfaces only once the electric machine has been placed. As a result, no vertical forces that could cause shearing movements of the buffer elements are acting on the buffer elements in the static state.

The inverse embodiment is of course also possible, in other words that the buffer elements in the horizontal plane act on respective vertical supporting surfaces of the respective frame-side main part and are fastened to holding elements arranged on the respective machine-side main part, which holding elements can be adjusted relative to the respective machine-side main part in a direction orthogonal to the respective vertical supporting surface and fixed relative to the respective machine-side main part.

The spring assemblies are preferably fastened to the respective machine-side main part and/or to the respective frame-side main part. As a result, the spring assemblies are held in a non-detachable manner on the respective main part. The spring assemblies can be fastened for example by means of clamping pieces (spring clamps).

The machine-side main parts are preferably fastened to the electric machine and/or the frame-side main parts are fastened to the frame construction in a detachable manner. This facilitates installation in particular. A typical example of a detachable fastening is a screw connection.

According to the invention, the machine-side main parts and the frame-side main parts have end stop elements, by means of which displacements of the machine-side main parts relative to the frame-side main parts in the horizontal plane and in the vertical direction are limited. This makes it possible to effect on the one hand a transportation restraint and on the other hand also an operational restraint.

The end stop elements preferably have markings so that the positioning of the machine-side main parts relative to the frame-side main parts in the horizontal plane can be quantitatively ascertained with the naked eye. Easy adjustment of the main parts relative to one another is thereby enabled. This is particularly advantageous if the active actuation elements are present.

BRIEF DESCRIPTION OF THE DRAWING

The above-described properties, features and advantages of this invention as well as the manner in which they are achieved will become clearer and more comprehensible in conjunction with the following description of the exemplary embodiments, which are explained in more detail in conjunction with the drawings. In the drawings, in schematic representation.

DETAILED DESCRIPTION OF PREFERRED EMBODIMENTS

Figure 1:
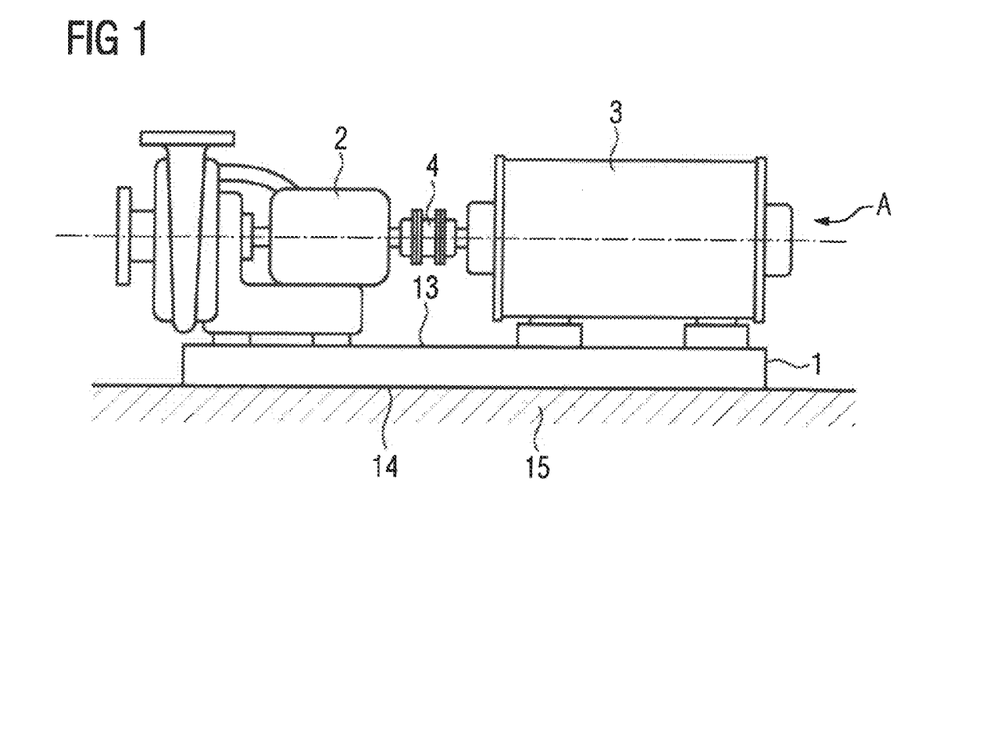
FIG. 1 shows a machine assembly from the side.
Figure 2:
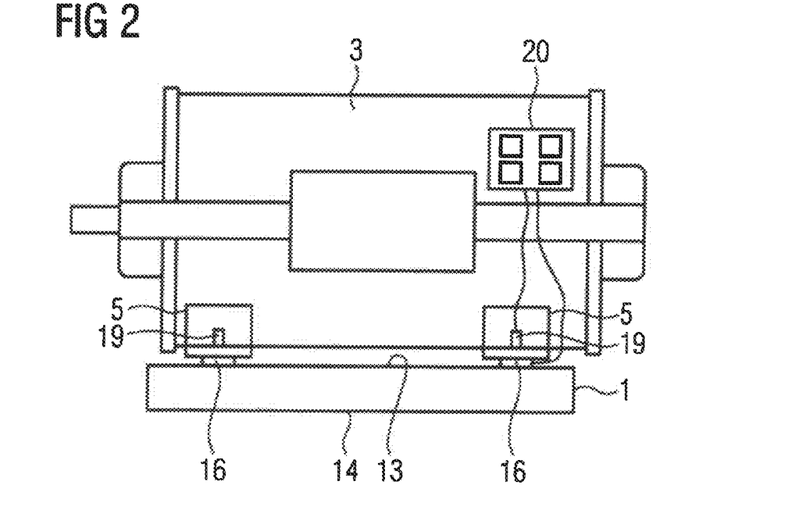
FIG. 2 shows a portion of the machine assembly from FIG. 1 in a somewhat more detailed representation.
Figure 3:
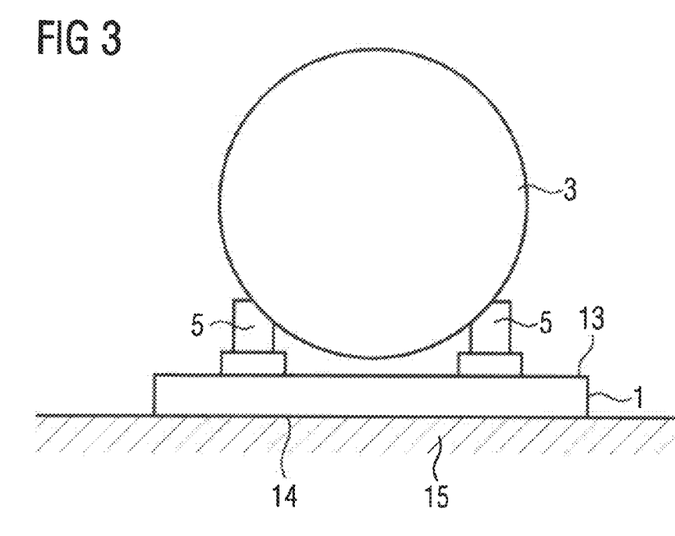
FIG. 3 shows the machine assembly from FIG. 1 from a direction A in FIG. 1.

According to FIGS. 1 to 3, a machine assembly has a frame construction 1. The frame construction 1 usually consists of steel beams. The steel beams can have a double T profile, for example. A load machine 2 is fastened to the frame construction 1. The load machine 2 can be a pump, a fan, a ventilator or a compressor, for example. The load machine 2 is driven by an electric machine 3. For this purpose, the load machine 2 is coupled to the electric machine 3 via a coupling 4.

The electric machine 3 is fastened to the frame construction 1 via several intermediate elements 5. The number of intermediate elements 5 is usually four. In this case, the intermediate elements 5 are usually arranged such that they form a rectangle. In individual cases, however, more or fewer intermediate elements 5 can also be present and the intermediate elements 5 can also be arranged differently. As a rule, however, at least three intermediate elements 5 are present, which are not arranged in a row, so that the intermediate elements 5 define a plane.

A single one of the intermediate elements 5 is explained in more detail below, firstly in connection with FIGS. 4 and 5, subsequently also in connection with further FIGS. The statements regarding the Intermediate element 5 shown apply to all intermediate elements 5. Insofar as certain statements are intended to apply only to individual intermediate elements 5, reference is made explicitly thereto in each case below.

Figure 4:
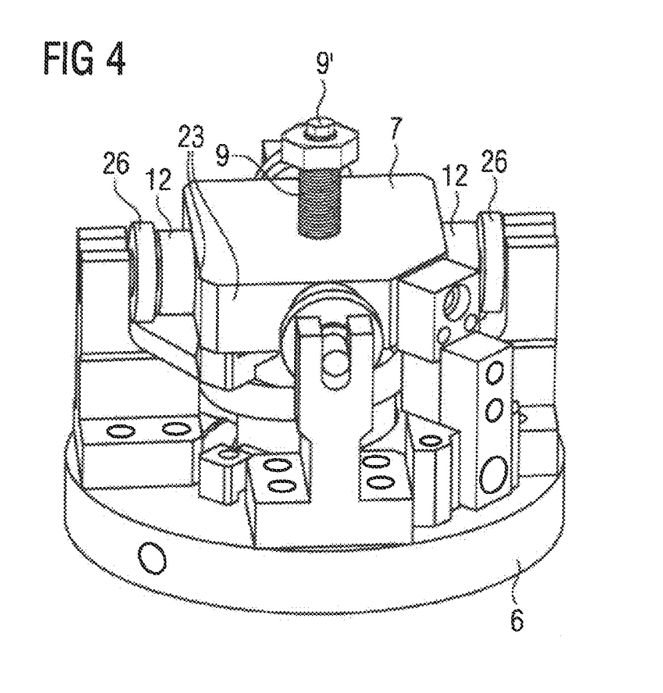
FIG. 4 shows an intermediate element in a perspective representation.
Figure 5:
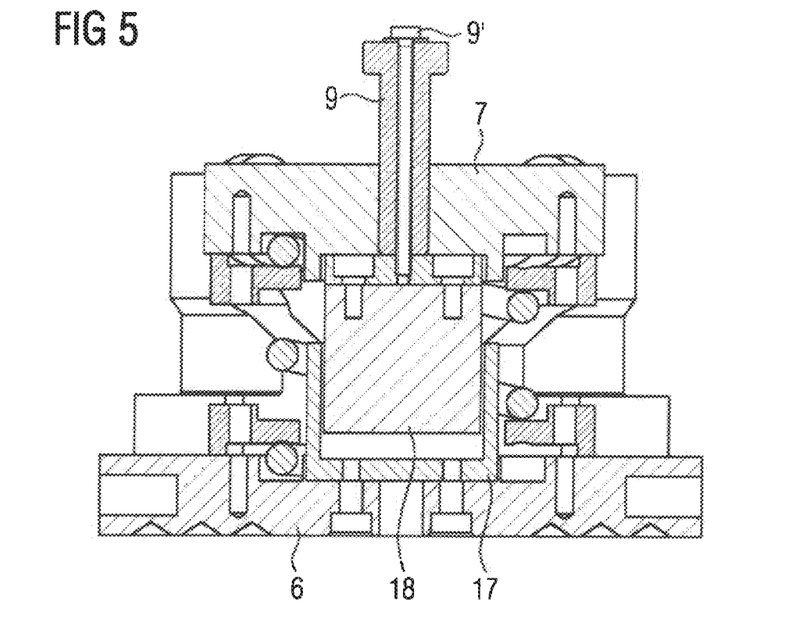
FIG. 5 shows a sectional view of the intermediate element from FIG. 4.

According to FIGS. 4 and 5, the intermediate elements 5 in each case have a frame-side main part 6 and a machine-side main part 7. The two main parts 6, 7 can for example be embodied in a plate-like manner or have a plate toward the frame construction 1 and toward the electric machine 3. The frame-side main parts 6 are fastened to the frame construction 1. The machine-side main parts 7 are fastened to the electric machine 3. The frame-side main parts 6 are fastened to the frame construction 1 and the machine-side main parts 7 are fastened to the electric machine 3 in a rigid manner. The main parts 6, 7 can be fastened to the frame construction 1 or to the electric machine 3 in a non-detachable manner. Preferably, however, they are fastened to the frame construction 1 or to the electric machine 3 in a detachable manner. They can be fastened for example via screw connections 8, 9 (indicated schematically by dashed lines in FIG. 6) to the frame construction 1 or to the electric machine 3. In a particularly preferred embodiment, the screw connection 9 between the machine-side main part 7 and the electric machine 3 is embodied as a hollow screw as shown in FIGS. 4 and 5. The reason for this will become evident later.

The intermediate elements 5 each have a spring assembly 10. The respective spring assembly 10 is arranged between the respective frame-side main part 6 and the respective machine-side main part 7. The spring assemblies 10 can be fastened to the respective frame-side main part 6 and/or to the respective machine-side main part 7. They can be held by means of clamps 11, for example. The weight force of the electric machine 3 is transferred via the spring assemblies 10 from the machine-side main parts 7 to the frame-side main parts 6. The spring assemblies 10 therefore absorb the entire weight force of the electric machine 3.

Figure 6:
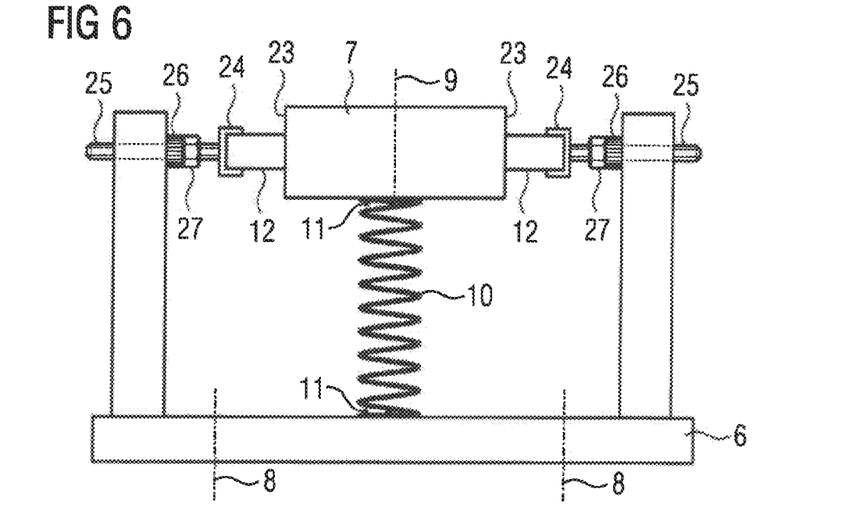
FIG. 6 shows a schematic view of the intermediate element from FIG. 4.
Figure 7:
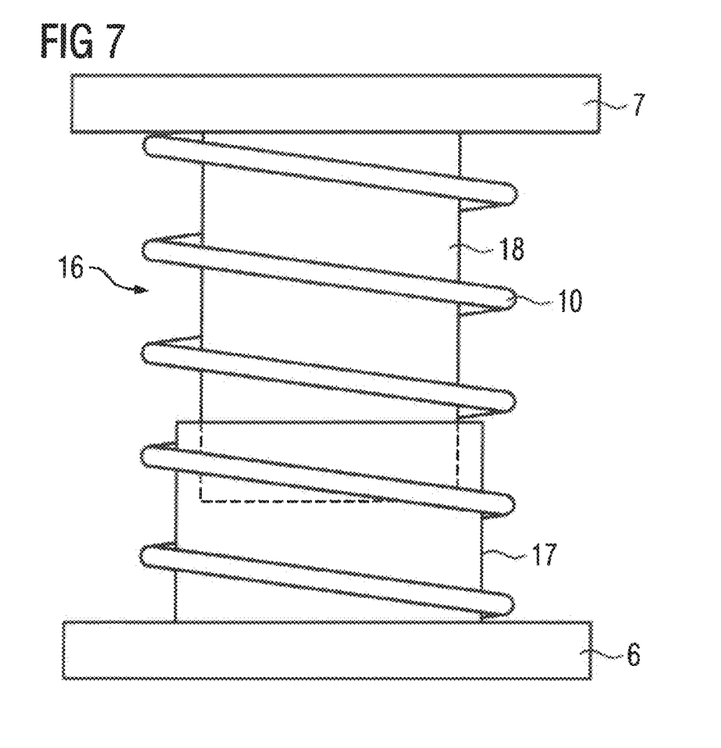
FIG. 7 shows a part of the intermediate element from FIG. 6, FIGS. 8 to 11 in each case show a plan view of two intermediate elements from above.

The spring assemblies 10 of the intermediate elements 5 are elements that are deformed during operation. The deformation is however exclusively elastic. Therefore, neither an immediate plastic deformation nor a gradual plastic deformation occurs. For example, the spring assemblies 10 can be embodied in each case as individual helical springs, as shown in FIGS. 6 and 7. Alternatively, they can be embodied for example as a group of helical springs arranged adjacent to one another. The helical springs usually consist of steel.

It is possible for no further elements to be present. However, the intermediate elements 5 usually also have resilient buffer elements 12 with a damping effect. In this case, the machine-side main parts 7 are held under pressure in the horizontal plane relative to the frame-side main parts 6 by means of the buffer elements 12. The buffer elements 12 can be embodied for example as rubber elements.

The load machine 2 can be fastened directly to the frame construction 1, in other words without intermediate elements 5 such as are provided for fastening the electric machine 3. Alternatively, the load machine 2 can also be fastened to the frame construction 1 via such intermediate elements 5. As a rule, however, both the load machine 2 and also the electric machine 3 are arranged "on" the frame construction 1. The frame construction 1 therefore has—see FIGS. 1 and 2—a horizontally oriented top side 13 and below the top side 13 a likewise horizontally oriented underside 14. The frame construction 1 rests with the underside 14 on a foundation 15. It is usually also fastened to the foundation 15. The load machine 2 and the electric machine 3 are fastened to the top side 13.

The intermediate elements 5 preferably also have in each case an active actuation element 16, as shown in FIG. 7. The respective active actuation element 16 consists of two active parts 17, 18, wherein the respective active part 17 is fastened to the frame-side main part 6 of the respective intermediate element 5 and the respective active part 18 is fastened to the machine-side main part 7 of the respective intermediate element 5. The fastening can be effected in particular by means of a screw connection. In particular in the case that the screw connection is embodied as a hollow screw between the machine-side main part 7 and the electric machine 3, a screw 9°, by means of which the respective active part 18 is fastened to the machine-side main part 7, is additionally guided through the hollow screw as shown in FIGS. 4 and 5.

The active actuation element 16 can be embodied for example as an electromechanical actuator in a manner similar to the drive of a loudspeaker. Irrespective of the specific embodiment, however, a force acting in the vertical direction can be generated by means of the respective active actuation element 16 between the respective frame-side main part 6 and the respective machine-side main part 7.

Insofar as the active actuation elements 16 are present, the respective intermediate element 5 also has (at least) one sensor element 19 as shown in FIG. 2. The respective sensor element 19 is assigned to the respective machine-side main part 7. It is capable of detecting a vertical movement of the respective machine-side main part 7 occurring during operation of the electric machine 3. The sensor elements 19 can be embodied for example as acceleration sensors or as speed sensors. It is possible for the respective sensor element 19 to be an integral component of the respective active actuation element 16 or even to be realized intrinsically by the respective active actuation element 16 itself.

The sensor elements 19 feed the sensor signals detected by them, in other words as a result the detected vertical movements of the machine-side main parts 7, to a regulation facility 20 assigned to the intermediate elements 5. As a result, the regulation facility 20 is capable of regulating the active actuation elements 16 dynamically during operation of the electric machine 3 so as to counteract the vertical movements of the machine-side main parts 7. The corresponding procedure is commonly known to persons skilled in the art as active vibration damping and therefore need not be described in detail.

The active actuation elements 16 act parallel to the spring assemblies 10. They can be arranged in particular concentrically to the respective spring assembly 10. For example, the respective spring assembly 10 can surround the respective active actuation element 16 as shown in FIG. 7 or conversely the respective active actuation element 16 can surround the respective spring assembly 10. Arrangements adjacent to one another are however also possible.

In the simplest case, the intermediate elements 5 are all embodied identically. It can however be advantageous to depart from the identical embodiment of all intermediate elements 5.

Figure 8:
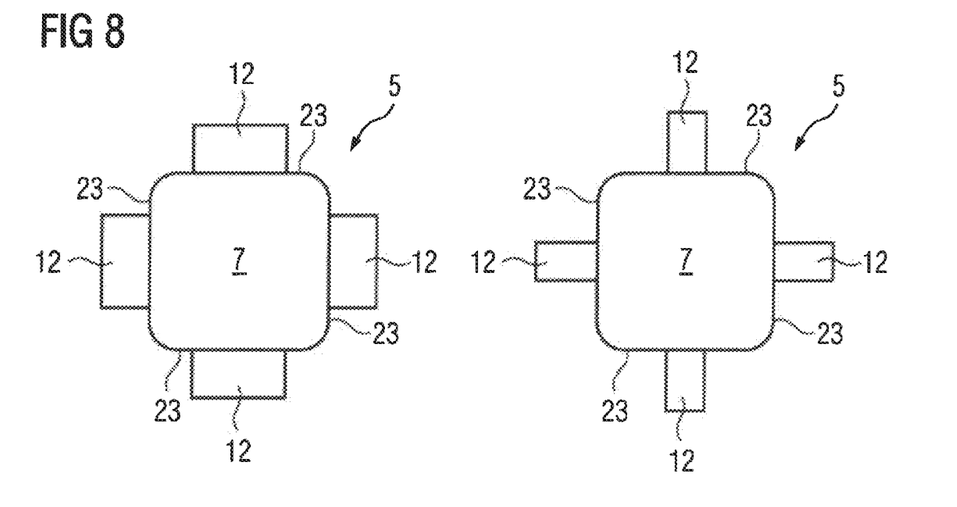

It is therefore possible, for example as shown in FIG. 8, for the buffer elements 12 of at least one of the intermediate elements 5 to be designed differently from the buffer elements 12 of at least one other of the intermediate elements 5. This is indicated in FIG. 8 by the buffer elements 12 of the one intermediate element 5 being drawn larger than the buffer elements 12 of the other intermediate element 5.

Figure 9:
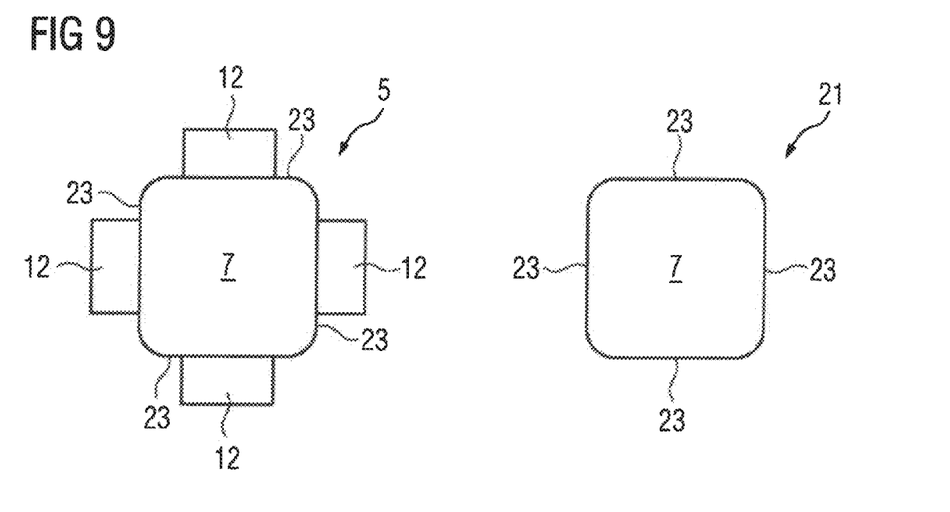
Figure 10:
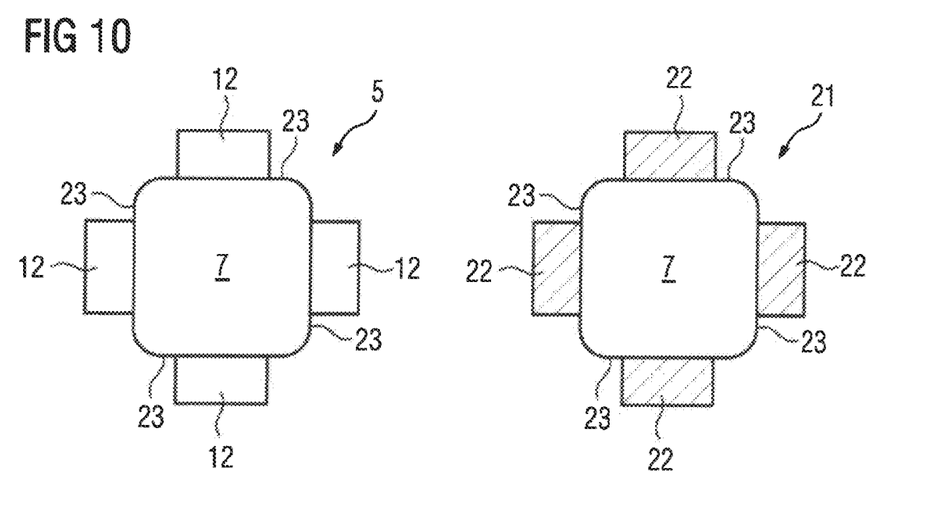
Figure 11:
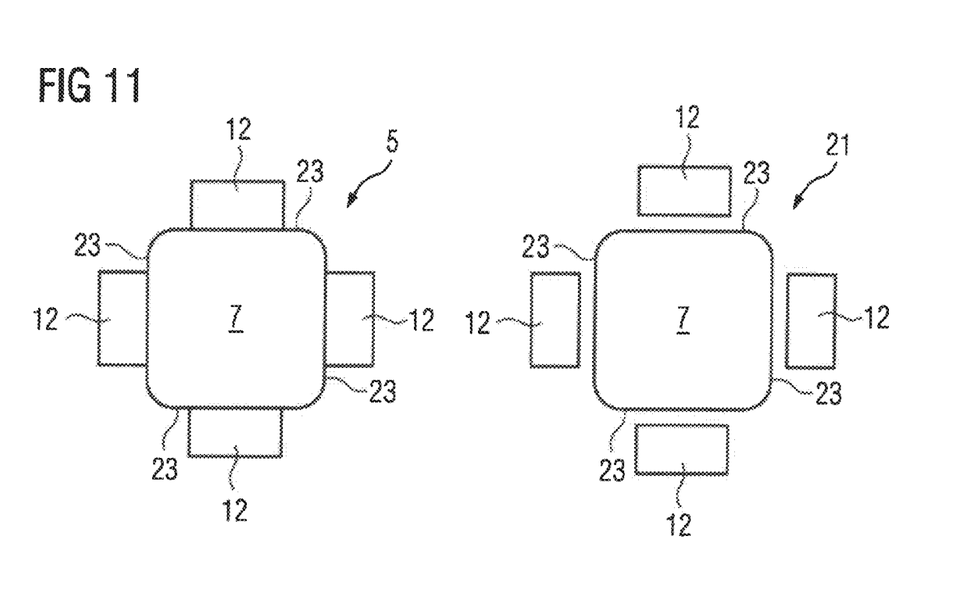

Alternatively, it is possible for at least one additional intermediate element 21 to be present in addition to the previously mentioned intermediate elements 5, as shown in FIGS. 9 to 11. In this case, the additional intermediate element 21 replaces one of the intermediate elements 5, so to speak. The machine assembly can for example have four intermediate elements 5, 21 in total, wherein three of the intermediate elements 5, 21 are the intermediate elements 5 and the fourth of the intermediate elements 5, 21 is the additional intermediate element 21.

The additional intermediate element 21 has essentially the same structure as the previously mentioned intermediate elements 5. It differs however in that the machine-side main part 7 is held differently in the horizontal plane. Different, mutually alternative embodiments are possible here.

It is therefore possible, for example as shown in FIG. 9, for the additional intermediate element 21 to differ from the other intermediate elements 5 in that no buffer elements are present in the case of the additional intermediate element 21. As a result, the machine-side main part 7 of the additional intermediate element 21 is held or fixed in the horizontal plane relative to the frame-side main part 6 of the additional intermediate element 21 only by the spring assembly 10 and, where applicable, the active actuation element 16 such that the damping of a vibration of the respective machine-side main part 7 in the horizontal plane is relatively weak.

It is alternatively possible, for example as shown in FIG. 10, for the additional intermediate element 21 to differ from the other intermediate elements 5 in that it has non-resilient bridging elements 22 instead of the buffer elements. The bridging elements 22 can be embodied for example as blocks of steel. This is indicated in FIG. 10 by corresponding crosshatching. The machine-side main part 7 of the additional intermediate element 21 is held or fixed rigidly relative to the frame-side main part 6 of the additional intermediate element 21 in the horizontal plane by the non-resilient bridging elements 22 such that it cannot vibrate in the horizontal plane.

In another alternative, it is possible as shown in FIG. 11 for the additional intermediate element 21 to differ from the other intermediate elements 5 in that, although it has buffer elements 12, the buffer elements 12 do not hold the machine-side main part 7 of the additional intermediate element 21 under pressure in the horizontal plane relative to the frame-side main part 6 of the additional intermediate element 21. For example, the buffer elements 12 of the additional intermediate element 21 can be spaced apart from the machine-side main part 7 of the additional intermediate element 21 as shown in FIG. 11. As a result, the machine-side main part 7 of the additional intermediate element 21 is not held or fixed relative to the frame-side main part 6 of the additional intermediate element 21 in the horizontal plane, but instead is able to vibrate freely in the horizontal plane.

In a further alternative, the spring assemblies 10 and the active actuation elements 16 of the intermediate elements 5 can be tuned to one another such that the spring damping characteristic of at least one of the intermediate elements 5 differs from the spring damping characteristic of at least one other of the intermediate elements 5.

The buffer elements 12 of the respective intermediate element 5 act on respective supporting surfaces 23 of the machine-side main part 7 of the respective intermediate element 5 in the horizontal plane, as shown in FIGS. 4 to 11. The supporting surfaces 23 are usually vertically oriented. Furthermore, the buffer elements 12 of the respective intermediate element 5 are fastened to holding elements 24 as shown in HG 6. The holding elements 24 are arranged on the respective frame-side main part 6. On the one hand, they can be adjusted relative to the frame-side main part 6 in a direction orthogonal to the respective vertical supporting surface 23, in other words in the horizontal plane. Furthermore, they can be fixed relative to the respective frame-side main part 6. For example, they can have a threaded bolt 25 on their sides facing away from the supporting surfaces 23 so that it is possible to make an adjustment in the horizontal plane by turning a knurled nut 26 and furthermore, following adjustment, the position then set can be fixed by means of a lock nut 27. Other embodiments are however also possible.

The inverse procedure is of course also possible, in other words that the holding elements 24 with their buffer elements 12 fastened thereto are fastened to the machine-side main part 7 and the buffer elements 12 act on respective vertical supporting surfaces 23 of the respective frame-side main part 6. This is not shown separately.

The possibility to adjust the holding elements 24 together with the buffer elements 12 in the horizontal plane on the one hand simplifies the installation of the electric machine 3 on the frame construction 1. This is the case in particular because, in order to install the electric machine 3 on the frame construction 1, it is possible firstly to retract the holding elements 24 so that no forces are applied to the machine-side main parts 7 in the horizontal plane when the electric machine 3 is placed on the machine-side main parts 7. Only once the electric machine 3 has been placed on the machine-side main parts 7 are the buffer elements 12 then engaged on the supporting surfaces 23.

The possibility to adjust the holding elements 24 together with the buffer elements 12 in the horizontal plane makes it possible inter alia to realize the embodiments according to FIG. 8 and FIG. 11. In particular, it is possible to engage the buffer elements 12 in the case of the intermediate element 5 shown on the right in FIG. 8 with lower pressure than in the case of the intermediate element 11 shown on the left in FIG. 8 in order to realize the embodiment according to FIG. 8. It is also possible to set the buffer elements 12 such that they are spaced apart from the supporting surfaces 23 in order to realize the embodiment according to FIG. 11.

Figure 12:
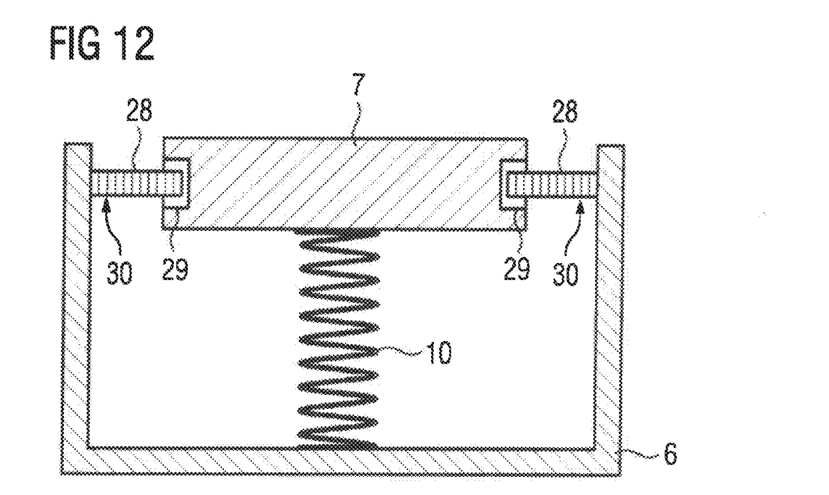
FIG. 12 shows a sectional view of parts of an intermediate element.
Figure 13:
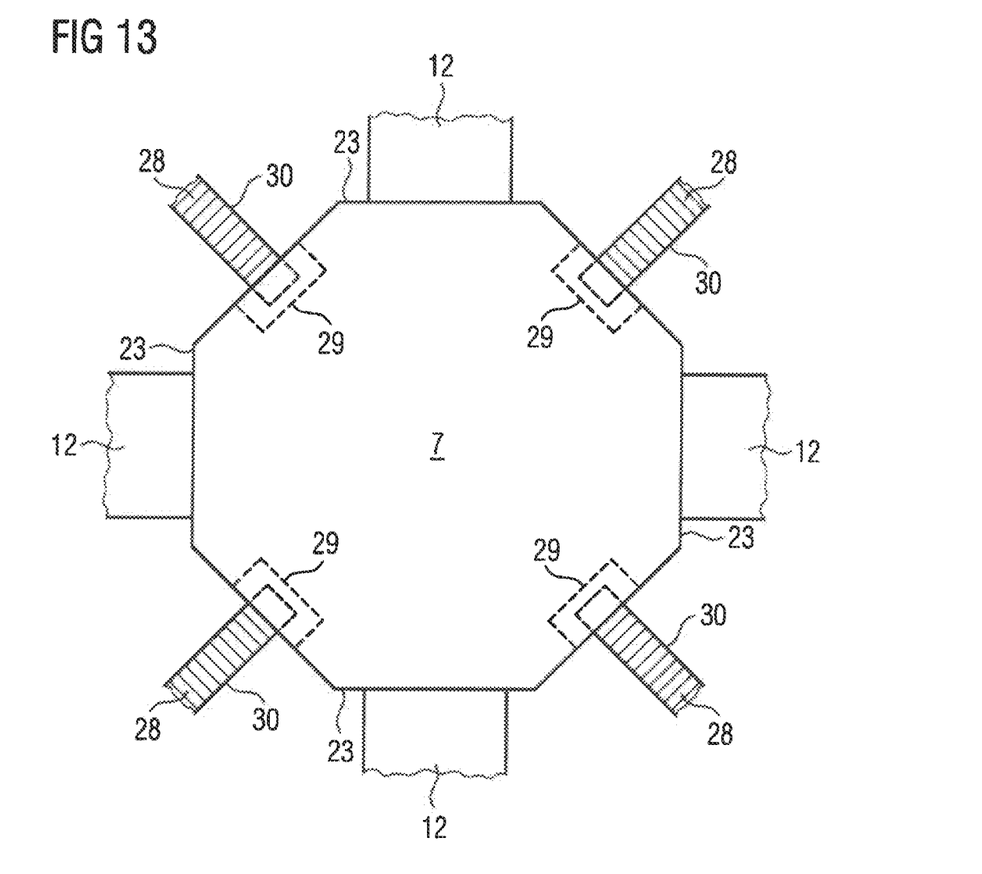
FIG. 13 shows the parts of the intermediate element from FIG. 12 from above.

In a particularly preferred embodiment, the machine-side main parts 7 and the frame-side main parts 6 have end stop elements 28, 29 as shown in FIGS. 12 and 13. Displacements of the machine-side main parts 7 relative to the frame-side main parts 6 in the horizontal plane and in the vertical direction can be limited by means of the end stop elements 28, 29. As a result, it is possible on the one hand to realize a transportation restraint. Furthermore, on the other hand it is also possible to limit the deflection in the horizontal plane and in the vertical direction such as can occur as a result of short-term mechanical overloading. Mechanical overloading can be caused for example by deflections on account of electrical short circuits or mechanical shocks.

The end stop elements 29 of the machine-side main parts 7 can be embodied for example as shown in FIGS. 12 and 13 as grooves extending in the vertical direction. The end stop elements 28 of the frame-side main parts 6 can be embodied in this case as pins that engage into the grooves. Other embodiments are however also possible.

The end stop elements 28, 29—here at least the end stop elements 28 of the frame-side main parts 6—have markings 30 as shown in FIGS. 12 and 13. The markings 30 form a scale. This enables the positioning of the machine-side main parts 7 relative to the frame-side main parts 6 in the horizontal plane to be quantitatively ascertained with the naked eye.

In summary, the present invention therefore relates to the following subject matter:

A load machine 2 is fastened to a frame construction 1. An electric machine 3 is coupled to the load machine 2, said electric machine driving the load machine 2. The electric machine 3 is fastened to the frame construction 1 via several intermediate elements 5. Frame-side main parts 6 of the intermediate elements 5 are fastened to the frame construction 1 and machine-side main parts 7 of the intermediate elements 5 are fastened to the electric machine 3. A spring assembly 10 is arranged in each case between the machine-side main parts 7 and the frame-side main parts 6, via which the weight force of the electric machine 3 is transferred from the machine-side main parts 7 to the frame-side main parts 6.

The present invention has many advantages. In particular, an effective damping of vibrations of the electric machine 3 can be achieved in a simple and reliable manner. This is particularly the case if the active actuation elements 16 are present. Restrictions of speed ranges are no longer required. Particularly when designing the active actuation elements 16 and their operation or when designing the regulation facility 20, it can also be considered that a transmission of vibrations into the foundation 15 is reduced to the greatest possible extent. In the case of an asymmetrical embodiment (for example according to FIGS. 8 to 11), it is furthermore also possible to damp all eigenmodes of vibrations of the electric machine 3 effectively. On account of the fact that the buffer elements 12 rest under pressure on the supporting surfaces 23, not only vibrations in the horizontal plane but also vertical vibrations are damped. As a result, a residual damping of a vertical movement of the respective main part 7 still takes place even in the event of a failure of the respective active actuation element 16. On account of the fact that the weight force of the electric machine 3 is absorbed fully by the spring assemblies 10, it is further possible to avoid or at least significantly reduce settling processes of the buffer elements 12 and the disadvantages associated therewith. It is further possible to fine-tune the alignment of the electric machine 3 by means of the active actuation elements 16 as required. In this case, however, a misalignment occurs in the event of a failure of an active actuation element 16.

Although the invention has been illustrated and described in greater detail on the basis of the preferred exemplary embodiment, the invention is not limited by the disclosed examples and other variations can be derived herefrom by the person skilled in the art without leaving the scope of protection of the invention.

What is claimed is:

1. A machine assembly, comprising:
a frame construction;
a load machine fastened to the frame construction;
an electric machine coupled to the load machine and driving the load machine;
a plurality of intermediate elements for fastening the electric machine to the frame construction, each of the intermediate elements including a frame-side main part fastened to the frame construction, a machine-side main part fastened to the electric machine, a spring assembly arranged between the machine-side main part and the frame-side main part for transferring a weight force of the electric machine from the machine-side main part to the frame-side main part, with the machine-side main part and the frame-side main part having interacting end stop elements for limiting a displacement of the machine-side main part relative to the frame-side main part in a horizontal plane and in a vertical direction, and an active actuation element for generating a force acting in the vertical direction between the machine-side main part and the frame-side main part;
sensor elements operably connected to the machine-side main parts of the intermediate elements in one-to-one correspondence and configured to detect a vertical movement of the machine-side main parts during operation of the electric machine; and
a regulation facility connected to the intermediate elements which feed the vertical movement of the machine-side main parts detected by the sensor elements to the regulation facility, said regulation facility configured to dynamically regulate the active actuation elements of the intermediate elements during operation of the electric machine so as to counteract the vertical movement of the machine-side main parts,
wherein the spring assemblies and the active actuation elements of the Intermediate elements are tuned to one another such that a spring damping characteristic of at least one of the intermediate elements differs from a spring damping characteristic of at least another one of the intermediate elements.

2. The machine assembly of claim 1, wherein the active actuation element is arranged concentrically to the spring assembly.

3. The machine assembly of claim 1, wherein the intermediate elements include resilient buffer elements with a damping effect, via which the machine-side main parts are held under pressure in the horizontal plane relative to the frame-side main parts.

4. The machine assembly of claim 3, wherein the buffer elements of at least one of the intermediate elements are designed differently from the buffer elements of at least another one of the intermediate elements.

5. The machine assembly of claim 3, wherein at least one of the intermediate elements is characterized by an absence of a buffer element.

6. The machine assembly of claim 1, wherein at least one of the intermediate elements is designed in one of two ways, a first way in which the at least one of the intermediate elements includes non-resilient bridging elements, a second way in which the at least one of the intermediate elements includes buffer elements which do not hold the machine-side main part of the at least one of the intermediate elements under pressure in the horizontal plane relative to the frame-side main part of the at least one of the intermediate elements.

7. The machine assembly of claim 6, wherein in the second way, the buffer elements are spaced apart from the machine-side main part of the at least one of the intermediate elements.

8. The machine assembly of claim 3, wherein the buffer elements in the horizontal plane act on vertical supporting surfaces of the machine-side main part and are fastened to holding elements arranged on the frame-side main part, said holding elements being adjustable relative to the frame-side main part in a direction orthogonal to the vertical supporting surfaces and securable relative to the frame-side main part.

9. The machine assembly of claim 3, wherein the buffer elements in the horizontal plane act on vertical supporting surfaces of the frame-side main part and are fastened to holding elements arranged on the machine-side main part, said holding elements being adjustable relative to the machine-side main part in a direction orthogonal to the vertical supporting surfaces and securable relative to the machine-side main part.

10. The machine assembly of claim 1, wherein the spring assembly is fastened to at least one of the machine-side main part and the frame-side main part.

11. The machine assembly of claim 1, wherein the machine-side main part is fastened to the electric machine in a detachable manner and/or the frame-side main part is fastened to the frame construction in a detachable manner.

12. The machine assembly of claim 1, wherein the end stop elements have markings to enable a positioning of the machine-side main part relative to the frame-side main part in the horizontal plane to be quantitatively ascertained with a naked eye.

* * * * *